(12) United States Patent
Fuerst

(10) Patent No.: US 7,386,578 B2
(45) Date of Patent: Jun. 10, 2008

(54) ASSOCIATIONS BETWEEN DUPLICATE MASTER DATA OBJECTS

(75) Inventor: Karl Fuerst, Walldorf (DE)

(73) Assignee: SAP AG, Waldorf (DE)

( * ) Notice: Subject to any disclaimer, the term of this patent is extended or adjusted under 35 U.S.C. 154(b) by 435 days.

(21) Appl. No.: 10/975,490

(22) Filed: Oct. 29, 2004

(65) Prior Publication Data

US 2006/0101096 A1 May 11, 2006

(51) Int. Cl.
*G06F 17/30* (2006.01)

(52) U.S. Cl. ............................. 707/201; 707/204

(58) Field of Classification Search ................ 707/204, 707/201
See application file for complete search history.

(56) References Cited

U.S. PATENT DOCUMENTS

| 6,253,213 | B1 | 6/2001 | Vanderschaaf |
| 2002/0033844 | A1 | 3/2002 | Levy et al. |
| 2002/0156761 | A1 | 10/2002 | Chen et al. |
| 2002/0165961 | A1 | 11/2002 | Everdell et al. |
| 2003/0023471 | A1 | 1/2003 | Kettler, III et al. |
| 2003/0115336 | A1 | 6/2003 | Auerbach et al. |
| 2003/0212654 | A1 | 11/2003 | Harper et al. |
| 2004/0031030 | A1 | 2/2004 | Kidder et al. |
| 2004/0039727 | A1 | 2/2004 | Dessloch et al. |
| 2004/0103182 | A1* | 5/2004 | Krabel et al. ............... 709/223 |
| 2004/0117358 | A1 | 6/2004 | von Kaenel et al. |
| 2006/0064465 | A1 | 3/2006 | Fuerst |

FOREIGN PATENT DOCUMENTS

| EP | 1043671 A2 | 10/2000 |
| WO | WO 01/27806 | 4/2001 |
| WO | WO 2004/057478 | 7/2004 |

OTHER PUBLICATIONS

Chengkau et al, "Object Mapping for Layered Cooperative Systems", pp. 67-76, IEEE 1999.
Strom et al, "Concurrency Control and View Notification Algorithms for Collaborative Replicated Objects", pp. 194-203, IEEE 1997.

(Continued)

*Primary Examiner*—Wilson Lee
*Assistant Examiner*—Kim T Nguyen
(74) *Attorney, Agent, or Firm*—Schwegman, Lundberg & Woessner P.A.

(57) ABSTRACT

In a method of sharing data between a central module and a client module, a plurality of duplicate first data objects and a second data object are stored on a first client module, where the second data object includes a first pointer pointing to one of the duplicate first data objects. A third data object and a fourth data object are stored on the central module, where the third data object corresponds to each of the first data objects, and where the fourth data object corresponds to the second data object and includes a second pointer pointing to the third data object. A first mapping is established between the first data objects and the third data object. A second mapping is established between the second data object and the fourth data object. A third mapping is established between the first pointer and the second pointer, and the first, second, and third mappings are stored.

18 Claims, 10 Drawing Sheets

OTHER PUBLICATIONS

"U.S. Appl. No. 10/943,137, Non-Final Office Action mailed Jul. 5, 2007", OARN, 1-20.

"International Search Report for EP Patent Application No. 05020213.4-1527", 7 pgs (Mar. 6, 2007).

Knolmayer et al., "Supply Chain Management Based on SAP System: order Management in Manufacturing Companies R/3 4.6 APO 3.0", *Springer-Verlag*, (Jan. 10, 2002), 85, 116-146.

Oki et al., "The Information Bus - An Architecture for Extensible Distributed Systems", *Operating System Review, ACM, New York, 27(5)*, (1993), 58-68.

\* cited by examiner

ASSOCIATIONS BETWEEN DUPLICATE MASTER DATA OBJECTS

TECHNICAL FIELD

This disclosure relates to managing different representations of information used by different data processing systems and more particularly to associations between duplicate master data objects.

BACKGROUND

Information technology ("IT") environments can consist of many different systems performing processes, such as business processes, on common master data. The different systems can be part of the same entity or can be part of different entities, such as vendors or contractors. The master data used for the processes can be stored in a number of different locations, systems, and/or incompatible formats. Branch offices of a company can work largely independently, adopted companies can introduce new software solutions to a group of affiliated companies, and systems from different vendors can be linked. Different master data models can make it difficult to integrate business processes in these scenarios.

Information, such as instructions for performing tasks and descriptions of the characteristics of items and people, can be stored in machine-readable representations by data processing devices. Different data processing systems often represent the same or similar information differently. For example, different schemes for organizing, associating, storing, processing, or encoding information can be used by different data processing systems. Discrepancies in the way information is represented often hinder or prevent different data processing devices from collaborating effectively.

SUMMARY

In general, a method and system are disclosed for distributing data objects having at least one association with a duplicate data object.

In a first general aspect, in a method of sharing data between a central module and a client module a plurality of duplicate first data objects and a second data object are stored on a first client module, where the second data object includes a first pointer pointing to one of the duplicate first data objects. A third data object and a fourth data object are stored on the central module, where the third data object corresponds to each of the first data objects, and where the fourth data object corresponds to the second data object and includes a second pointer pointing to the third data object. A first mapping is established between the first data objects and the third data object. A second mapping is established between the second data object and the fourth data object. A third mapping is established between the first pointer and the second pointer, and the first, second, and third mappings are stored.

Implementations can include one or more of the following features. A plurality of duplicate fifth data objects corresponding to the third data object to a second client module can be can be distributed, a sixth data object corresponding the fourth data object to the second client module can be distributed, and a pointer from the sixth data object to one of the duplicate fifth data objects can be generated based on the third mapping. The second client module can be identical to or different from the first client module. When the second client module is identical to the first client module, the fifth data objects can provide update information stored in the first data objects and the sixth data object updates information in the second data object.

Data objects can be identified as duplicate first data objects based on information contained in each of the data objects. Information in the duplicate first data objects on the client module can be consolidated into a single third data object on the central module.

A seventh data object can be stored on the central module, and the second pointer can be changed to point from the fourth data object to the seventh data object. When a plurality of duplicate eighth data objects, corresponding to the seventh data object, are distributed to a second client module, and a sixth data object, corresponding to the fourth data object, is distributed to the second client module, a third pointer from the sixth data object to one of the duplicate eighth data objects can be generated, and a fourth mapping between the third pointer and the second pointer can be generated, and the fourth mapping can be stored. The third pointer can be manually generated.

In another general aspect, a system includes one or more client modules and a central module. A first client module includes a first client data store adapted for storing a plurality of duplicate first data objects and a second data object, where the second data object includes a first pointer pointing to one of the duplicate first data objects. The central module includes a central data store adapted for storing a third data object, a fourth data object, and a first second, and third mapping. The third data object corresponds each of the first data objects, the fourth data object corresponds to the second data object and includes a second pointer pointing to the third data object, the first mapping is between the first data objects and the third data object, the second mapping is between the second data object and the fourth data object, and the third mapping is between the first pointer and the second pointer.

Implementations can include one or more of the following features. The system can include a second client module, where the central module is adapted for distributing a plurality of duplicate fifth data objects corresponding to the third data object to the second client module, distributing a sixth data object corresponding the fourth data object to the second client module, and generating a pointer from the sixth data object to one of the duplicate fifth data objects based on the third mapping. The second client module can be identical to or different from the first client module. When the second client module is identical to the first client module, the fifth data objects can update information stored in the first data objects and the sixth data object updates information in the second data object.

The central module can be further adapted for identifying data objects as duplicate first data objects based on information contained in each of the data objects. The central module can be further adapted for consolidating information in the duplicate first data objects on the client module into a single third data object on the central module.

The central module can be further adapted for storing a seventh data object and changing the second pointer to point from the fourth data object to the seventh data object. The central module can be further adapted for distributing a plurality of duplicate eighth data objects to a second client module, where the eighth data objects correspond to the seventh data object, and distributing a sixth data object to the second client module, wherein the sixth data object corresponds the fourth data object. The central module can be further adapted for receiving a third manually-generated pointer from the sixth data object to one of the duplicate eighth data objects, generating a fourth mapping between the third pointer and the second pointer, and storing the fourth mapping.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1A:
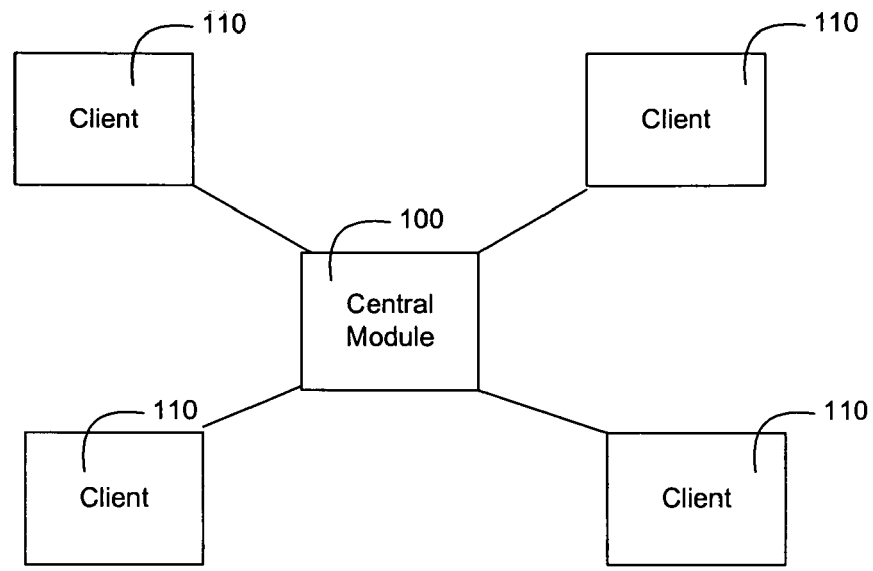
FIGS. 1A and 1B are block diagrams illustrating a collaborative master data management system.

As shown in FIG. 1A, a collaborative master data management ("cMDM") system includes a central module 100 and one or more client modules 110. Each client module 110 is linked directly to the central module 100.

The central module 100 can include a central system representing a centralized control of data management for an entity, such as a business or an organization. The client modules 110 can include systems or groups performing processes on master data. For example, the client modules 110 can include systems and/or groups involved in a product creation process. In this example, the client modules 110 can include a legacy module, an e-procurement module, an e-sales module, a sourcing module, a collaborative engineering module, a manufacturing module, and enterprise resource planning ("ERP") modules.

The master data can be stored in the client module 110, in the central module 100, or in both, depending on the implementation. The central module 100 allows the master data used by each client 110 to include master data that is shared by all clients 110. Traditionally, client modules 110 would communicate directly with each other in a point-to-point architecture. For example, a manufacturing module might need to share master data with an e-procurement module, an e-sales module, and a collaborative engineering module, among others. In traditional systems, the manufacturing module would receive data from or transmit data to the appropriate module, which could lead to inconsistency in data or the use of obsolete data, if data is not updated in the module transmitting the data for sharing. In the system described with reference to FIG. 1A and FIG. 1B, data are managed through the central module 100. The central module 100 ensures consistent master data, and the distribution of the master data.

Figure 1B:
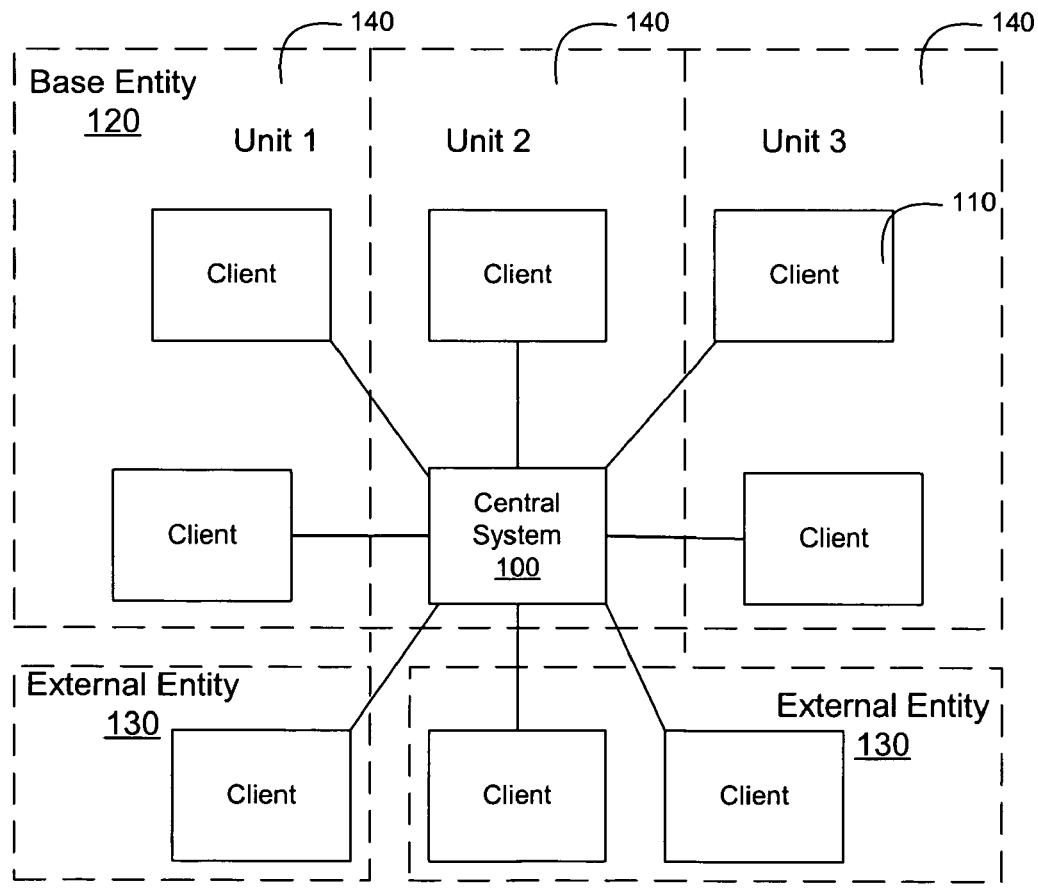

As shown in FIG. 1B, the cMDM system can be implemented to be used across a plurality of entities 120 and 130. The central module 100 can be part of a base entity 120. The client systems 110 can be part of the base entity 120 or part of an external entity 130. For example, the base entity 120 can include an enterprise including client modules 110 for ERP, legacy, e-procurement, and e-sales. The base entity can be divided into units 140, where each unit can include one or more clients 110. The external entities 130 can include a contractor including a client 110 for manufacturing and a supplier including clients 110 for collaborative engineering and sourcing.

In another example, the base entity 120 can include a customer service entity while an external entity 130 can include an enterprise. Customer information that may normally be dispersed over multiple client modules 110 can be consolidated through central system 100.

The centrally managed master data can be used for processes such as cross-group reporting, data integration for mergers and acquisitions, reducing the diversity of parts, supporting product maintenance, simplification of customer management, and supporting catalogs, such as through merging catalog contents and bundling of purchasing activities into a smaller number of vendors. The cMDM system can also support versioning and change management. As versions are created or changes made, the data for the versions or changed data can be managed through central module 100, as described below.

A setup of a cMDM system can be performed before data is exchanged between the cMDM system and client modules 110. Identification attributes are specified for master data objects and rules for matching are established. The setup of attributes and rules for matching can be performed with regard to the entity using the cMDM system, or with regard to the object needs in general. A matching process performed on master data objects received from client modules can be used to manage the master data objects.

Specifying attributes can include matching different objects from different client applications or different client modules 110. Specifying attributes can also include linking elements of the matched structures together so that master data objects received from different client systems can be compared.

The specified attributes can also be ranked during setup. The ranking of attributes can be used during a matching process to determine whether two master data objects are identical. Thus, if an attribute that is ranked higher doesn't match between two objects, it is more likely that they are not identical or similar than if an attribute ranked lower on the list does not match.

Figure 2:
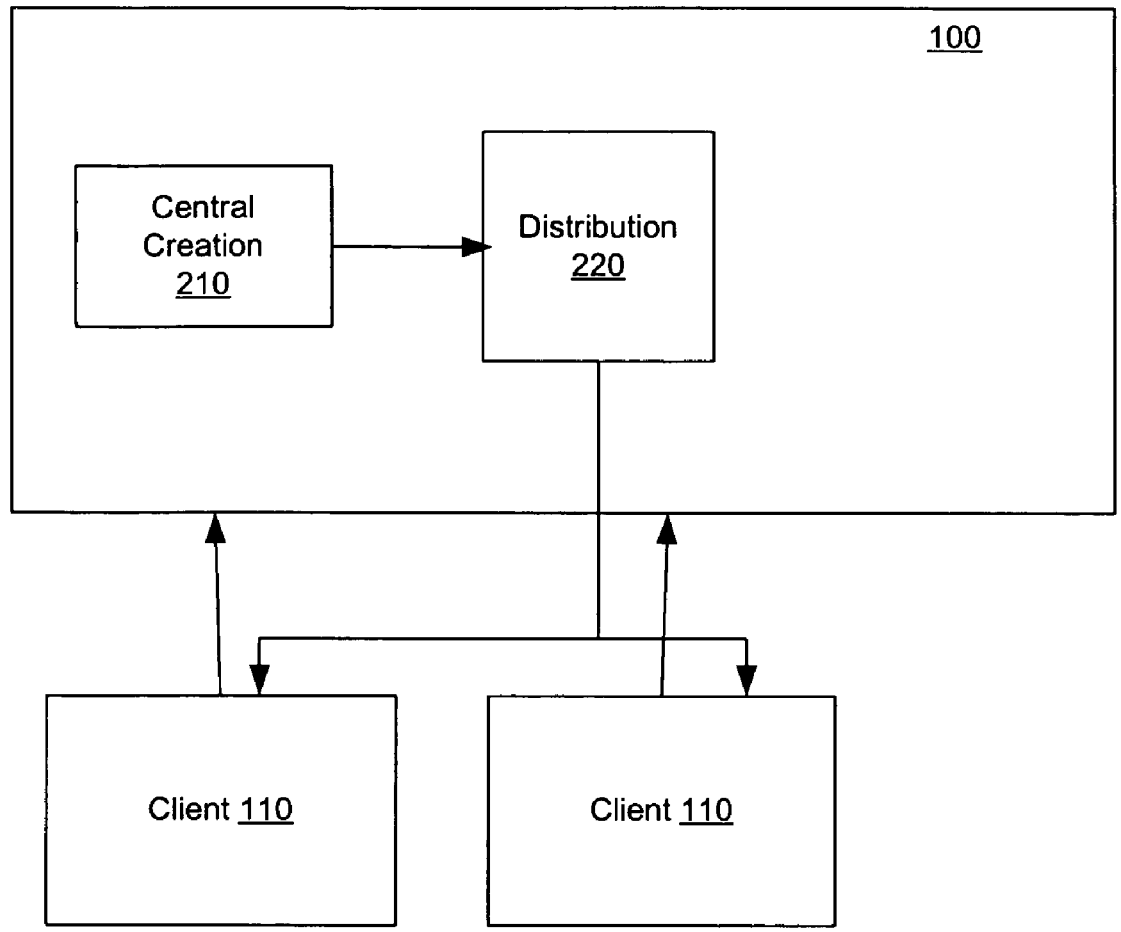
FIG. 2 is a block diagram illustrating a content consolidation implementation of a collaborative master data management system.

FIG. 2 is a block diagram illustrating a central master data management implementation of a cMDM system. In the central master data management scenario, master data is controlled completely in the central module. In this implementation, all master data information resides centrally in central module 100. This implementation can be used for applications such as a central product data pool supplying product data to multiple locations for production, assembly, sales, and distribution.

At central creation module 210, master data objects can be created. The created master data objects can include complete object information including complete object definition, object mapping information and object dependencies. The master data objects can be created in response to a request from a client module 110. Matching processes can be performed in response to the request, and mapping information can be included in the data object information stored in the central module 100. If identical objects exist in the central module 100, the requesting client module 110 can be notified that an identical object exists, and a new master data object is not created or mapped to an existing object. The mapping information can be updated.

At distribution module 220, the centrally maintained master data information can be distributed as individual objects as they are defined in the client modules 110. The objects can be distributed in packets. Objects that belong together can be changed and distributed together. If the master data includes product model master data, the objects that belong together, such as products, BOMs (bills of material), and documents, are collected together in a consistent packet and distributed together. The objects can be collected according to information requirements of the recipient client module 110. For example, the objects can be collected in reference to a particular view for a product. A view can include product relevant attributes, such schematic design drawings, a bill of a materials, a list of vendors that can supply the materials. Thus, a group of objects can be linked according to usage or location. For example a sales view can include attributes or content of objects that are related to or used by a sales department.

As discussed above, the scenarios can be used together. For example, central master data management can be used for central data object master data objects, where all of the central data object master data object information is maintained in central module 100. The central module 100 can store only global attributes for the rest of the data objects, such as product master data objects.

Figure 3:
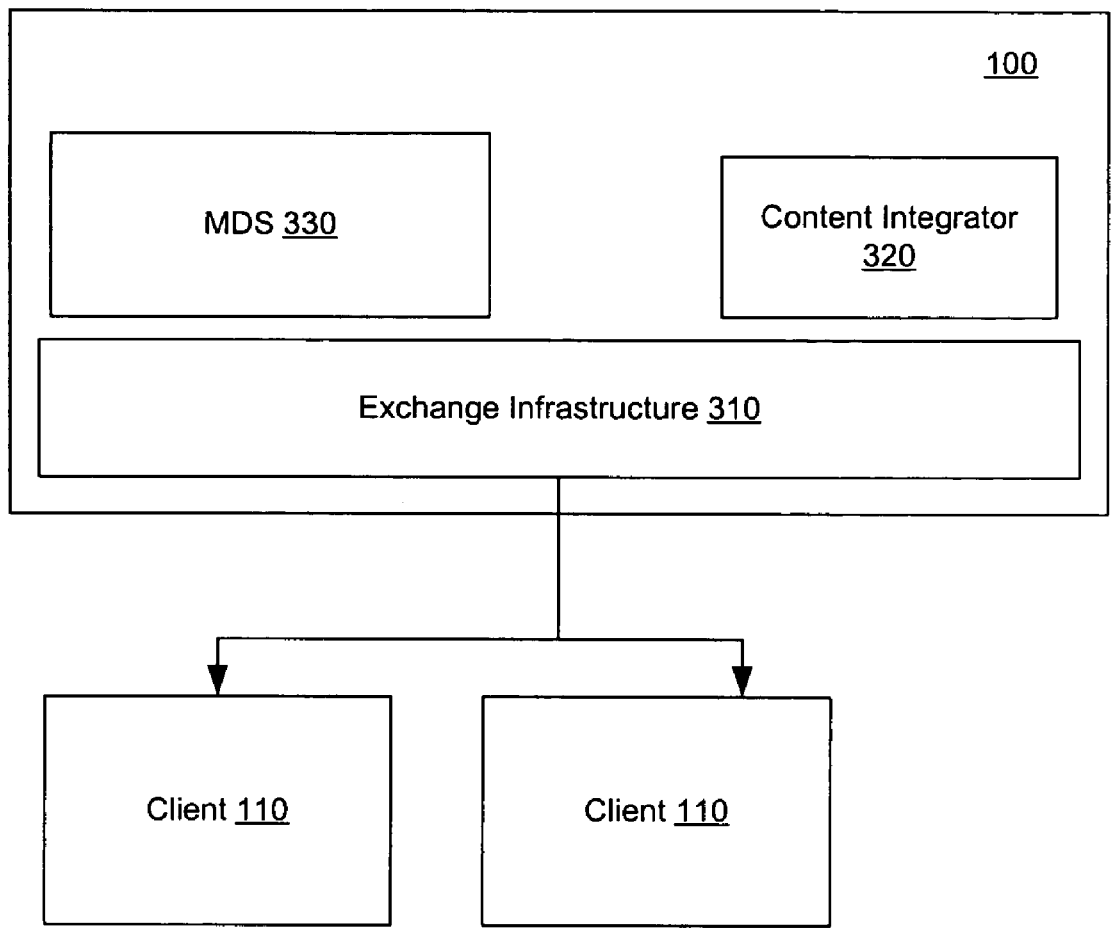
FIG. 3 is a block diagram illustrating a collaborative master data management module.

FIG. 3 is a block diagram illustrating a simplified structure of a central module 100. Central module 100 can include an exchange infrastructure ("XI") 310, a content integrator ("CI") 320, and a master data server ("MDS") 330. The XI 310 can be used for communication between client modules 110 and central module 100.

Master data that is to be distributed is received in XI 310. Distribution can be performed in three different ways, including subscription-based distribution, historic distribution, and content-based distribution. A routing model (not shown) stores information about which systems are interested in the master data. The master data is then sent from the XI 310 to the relevant systems. Queuing can be used to ensure consistent messaging across the XI 310. Messages can be sent in XML (extensible markup language) format between the systems.

CI 320 can correlate master data from different systems by defining identifying attributes for each object. The identifying attributes are fed to CI 320 from different systems in client modules 110 and scanned for analogousness according to predefined rules. The CI 320 saves an object ID for objects in the system landscape, no matter to which system they belong, or to which data model they are subject. Master data objects that are stored in client modules 10 retain the identification defined in the respective client systems storing the master data objects. CI 320 understands that the respective instantiation relates to some other object in the system (using the mapping function). Thus, CI 320 performs the matching processes and preparation of the resulting ID mappings.

In one example, mapping can be done using industry specific standards. Different industries such as Chemicals, Consumer Products ("CP")/Retail and so on, define standards of how an object should be described for their requirements. In one industry, for example, in CP it can be sufficient to describe a product name, description and a class (e.g. 'SWEETS'), while in Chemicals using only the class is insufficient. Thus, attributes and their values can be used to describe the chemicals sufficiently. Thus, the attributes can be like a language for an industry. Therefore, the mapping of a MDM standard-xml format to industry specific standards is supported. Industry specific standards include, for example, CIDEX, Pidx, RosettaNet, and Pricat.

CI 320 use the mappings for a double-checking process for creating objects. The central module 100 receives a request to create a master data object. The CI 320 checks the request for identical objects. If no match is found, the central module generates a new object. The CI 320 then performs a check for the new object. If no match is found, then the central module stores the new master data object. Thus, even if the first check is incomplete based on the description provided by the client module 110, a match may be found when the object is completely created.

Merge strategies can be used to combine two or more objects that are found to be similar or identical. For example, if a master data object for a pump is produced in a purchasing system, a sales system, and a production system, one object can be created in central module 100 by merging the three duplicate master data objects. For example, a new object can be created where different systems have authorizations for different parts of the object. Thus, a purchasing system can maintain purchasing information for the master data object. Although the purchasing system can view sales and production information, the purchasing system can be given authorization only to maintain the purchasing information.

MDS 330 can include a central data store for storing data objects. MDS 330 can perform the processes of object creation and change. MDS 330 can also provide services for change management, such as unified versioning, and status management. Grouping of changed objects into packets for distribution can also be performed in MDS 330.

Figure 4:
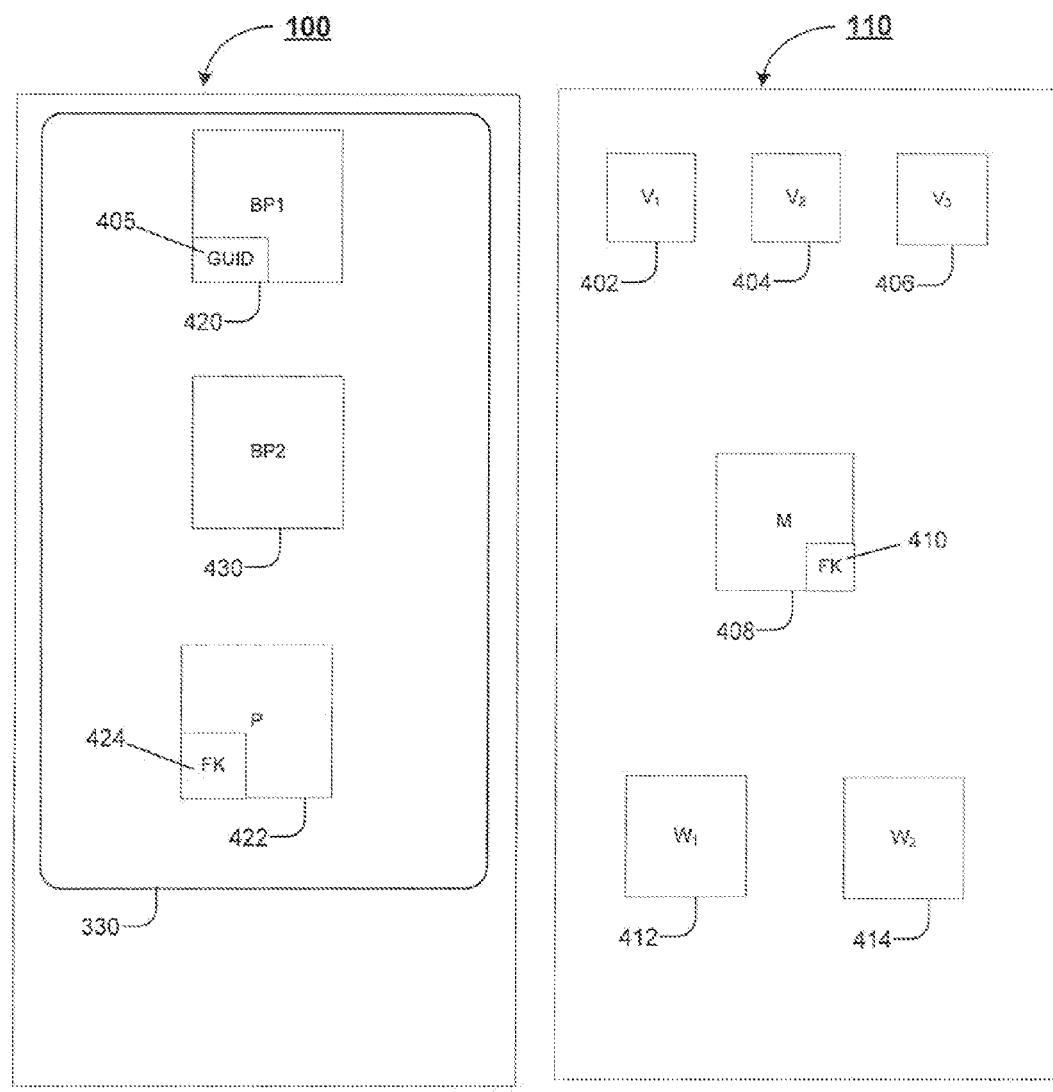
FIG. 4 is an schematic block diagram illustration associations between data objects on a central module of a master data management system and on a client module of a master data management system.

For purposes of illustration, FIG. 4 shows an example of associations of data objects used in a central module 100 and duplicate data objects used in a client module 110. In particular, FIG. 4 shows an example of a particular client module 110 that stores data objects 402, 404, and 406 (i.e., $V_1$, $V_2$, and $V_3$), which are duplicate representations of the same vendor from which parts and materials are purchased by a user, and a data object 408 (i.e., M) that represents a material that is purchased from the vendor. Each of the data objects 402, 404, 406, and 408 in the client module 110 can be uniquely identified by one or more "object-keys." An object-key can be a globally unique identification key ("GUID") (e.g., a 32-bit hexadecimal identification character that uniquely distinguishes a data object from all other data objects used in the cMDM system) a user-recognizable name of the central data object 408, and/or various data relating to the central data object. Although the vendor represented by $V_1$, $V_2$, and $V_3$, is the same in the context of the cMDM system, the different data objects $V_1$, $V_2$, and $V_3$, may represent different aspects of the vendor, e.g., different addresses, production facilities, or warehouses used by a vendor. For example, $V_1$ may refer to a first warehouse, $V_2$ may refer to a second warehouse, and $V_3$ may refer to a third warehouse. The fact that the data objects $V_1$, $V_2$, and $V_3$ represent the same vendor can be expressed by a relationship between the object-keys identifying the data objects. This relationship can be realized, for example, by a key-mapping using the unique object keys. The object keys for each of the data objects $V_1$, $V_2$, and $V_3$, would then be part of the same key-mapping group. Client module 110 may also include data objects 412 and 414 that refer to a second vendor.

Another data object 408 may include a reference to one or more of the duplicate data objects 402, 404, or 406. For example, the data object M may describe a material that is part of a product to be assembled. The data object M may include a reference to one of the other data objects to indicate that an association exists between the data object M and the other data object. For example, if the material represented by data object M is to be sourced from the vendor represented by $V_1$, $V_2$, and $V_3$, the data object 408 may include a reference 410 to at least one of the duplicated vendor data objects. If the material represented by the data object M is to be sourced from a particular one of the vendor's warehouses (e.g., the second warehouse), the data object M may include a reference 410 to the particular data object $V_2$ that represents the particular warehouse. This may be the case if the user has determined that material is delivered in the least amount of time from the second warehouse or if the user has determined that the material sourced from the second warehouse is of the highest quality. The reference 410 within one data object 408 to another data object 404 can be known as a "foreign key" because it provides information about an association with a different data object that is related to the data object containing the foreign key.

On the central module 100 side of the system, a MDS 330 may include a central data object 420, which is identified by a GUID 405, and which stores information concerning a company or organization with whom a user interacts. For example, the central data object 420 can refer to the vendor company that supplies materials used to build a product based on designs supplied by the user, and the central data object 430 can refer to a second vendor company that is represented by data objects 412 and 414 on the client module 110. A single data object 420 representing the first vendor on the central module 100 side of the system may suffice to describe the vendor represented by data objects $V_1$, $V_2$, and $V_3$ on the client side when the data objects on the client module 110 are known to be duplicates of each other. For example, content integrator 320 can determine that data objects $V_1$, $V_2$, and $V_3$ are duplicates and can store their information in a single data object 420. The MDS 330 can also include a data object 422 that refers to the product that is to be built. The data object 422 is the MDS-representation of the MDC data object 408. Data objects stored and used on the central module can also include foreign keys. For example, the product data object 422 can include a foreign key 424 indicating that a material used in the product represented by data object 422 is to be sourced from the vendor represented by data object 420.

Information concerning data objects 402, 404, 406, and 408 on the client module 110 and data objects 420 and 422 on the central module 100 can be exchanged between the central module 100 and the client modules 110. To send a data object from a source module (e.g., central module 100) to a target module (e.g., client module 110), the data object's information can be converted into a source message in the source module, which is transmitted to the target agency, which receives the message as a target message that it converts into an object on that target agency. The source message and the target message are external representations of the data objects stored and used by source and target modules and generally can have a different structure from the data structures of the data objects stored and used on the source and target modules. Messages generally include object-keys and/or foreign keys pointing to other objects, so that the amount of data actually transmitted can be reduced. Thus, when a message is transmitted from a source agency to a target agency, a mapping between the source object and the target object can be used to coordinate the data transfer. The message can also include a foreign key indicating a relationship between the data object specified by the object key in the message and another data object. The use of object keys and foreign keys pointing to other data objects allows the payload of a transmitted message to be smaller than if the data object themselves were transmitted in the message, but also enables retrieval of information in the data objects to which the object keys and foreign keys point.

When a message is sent from one module to another module, a mapping between the source message and the target message can be used to identify the information that is being transferred. A problem arises if a mapping is used between the foreign key in the source message to the foreign key in the target message and at least one of the foreign key-mappings is ambiguous, meaning that the mapping of the foreign key from the source data object to the target-value returns more than one key. For example, if a message describing the product data object 422 is sent from the MDS 330 to the client module 110, the message will include a foreign key specifying the vendor 420. However, the vendor data object 420 on the central module maps to three duplicate data objects $V_1$, $V_2$, and $V_3$ on the client module. Normally, this ambiguous mapping is inconsequential because the data objects $V_1$, $V_2$, and $V_3$ are known to be duplicates of each other and a reference from a data object to any one of the data objects $V_1$, $V_2$, and $V_3$ provides all necessary and sufficient information. However, if the foreign key 410 in the data object M used on the client module 110 refers to a particular representation $V_2$ of the vendor it may be important or desirable to resolve this ambiguity.

Figure 5:
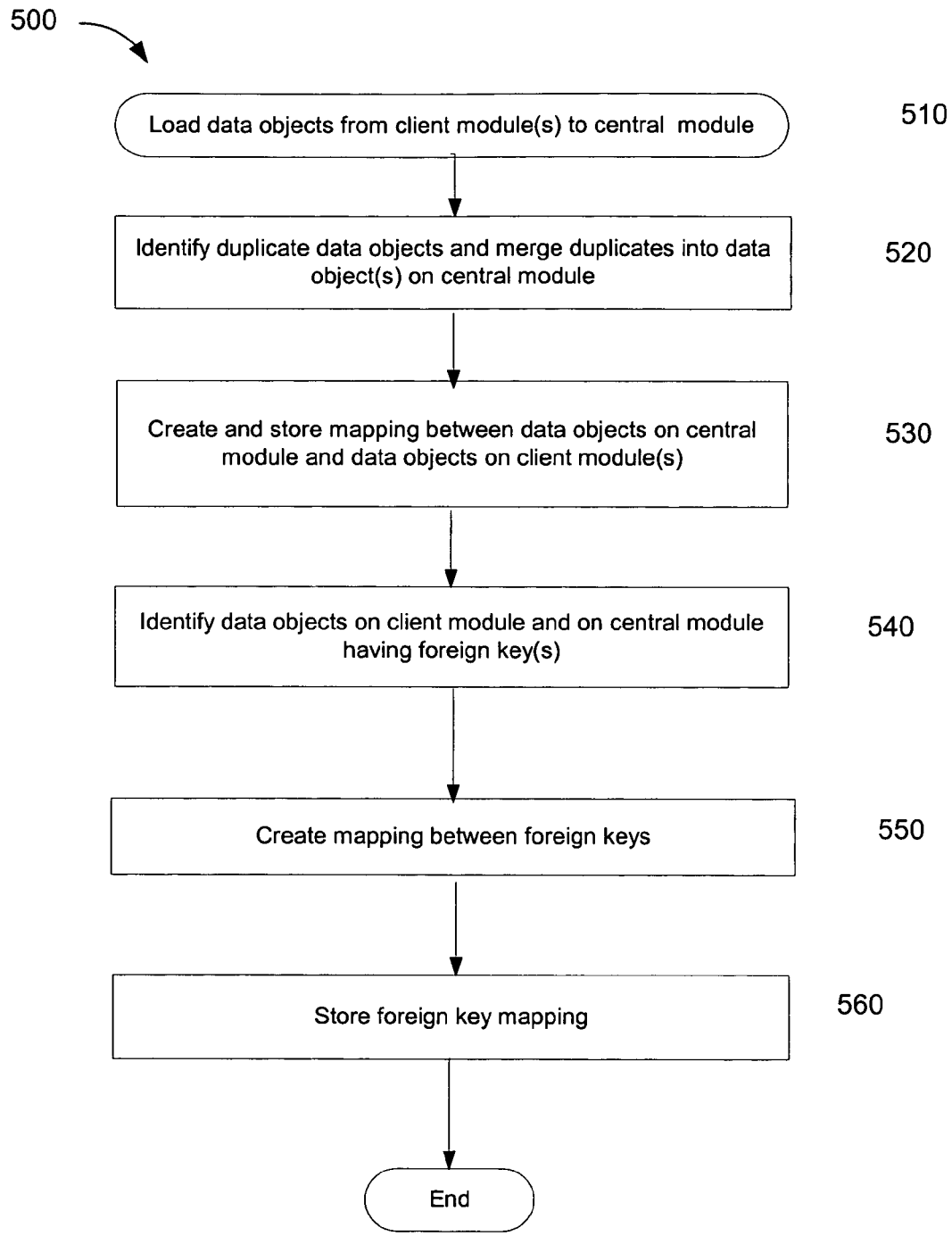
FIG. 5 is a flow chart of a process for mapping representations of information between different systems.

Referring to FIG. 5, to resolve the ambiguity between duplicate data objects on the client module 110, one of which is referred to by a foreign key in another data object, additional information is gathered and stored in the central module 100 during a process 500 that allows unambiguous identification of the data object that is referenced by the foreign key. The process 500 begins when data objects 402, 404, 406 and 408 are loaded from the client module 110 to the central module 100 (step 510). As the data objects are loaded, or after they have been loaded, duplicate data objects $V_1$, $V_2$, and $V_3$ are identified so that they can be matched and merged into at least one data object 420 on the central module 100 (step 520). A mapping can be created between central module data objects 420 and client module data objects 402, 404, 406, and between central module data object 422 and client module data object 408, and the mappings can be stored in the MDS 330 (step 530). For example, a mapping between the object-keys identifying vendor data objects $V_1$, $V_2$, and $V_3$ on the client module 110 and business partner data object BP on the central module 100 can be created and stored on the MDS 330. Additionally, a mapping between the object-keys identifying product data object P on the central module 100 and the materials data object 408 on the client module 110 can be created and stored on the MDS 330. A data object on the central module 100 having a foreign key pointing to another data object is identified, as is the data object to which the foreign key points (step 540). For example, the product data object 422 can be identified as having a foreign key 424 that points to the vendor data object 420. Then, the corresponding data object 408 and foreign key 410 on the client module 110 are identified, as well as the data object 404 to which the client-side foreign key points (step 540). When the corresponding data objects 422 and 408 and foreign keys 424 and 410 on the central and client modules 100 and 110 are identified, a mapping is created between the foreign key 424 on the central module 100 and the foreign key 410 on the client module 110 (step 550), and the mapping is stored (step 560). The mapping is stored on the central module 100 (e.g. on the MDS 330). Then, when data are distributed from the central module 100 to the client object 110, the foreign key mapping is used to ensure that the proper association between a data object 408 that references one on several duplicate data objects 402, 404, and 406 is maintained.

Although the mapping between data objects has been described with reference to the example of duplicate data objects representing a vendor, the method of mapping and distributing data objects having at least one association with a duplicate data object is valid for any kind of object types, for example, product data objects having associations with business-partner data objects, bill-of-material data objects having associations with product data objects, business-partner data objects having associations with document data objects, and other kinds of data objects.

Figure 6:
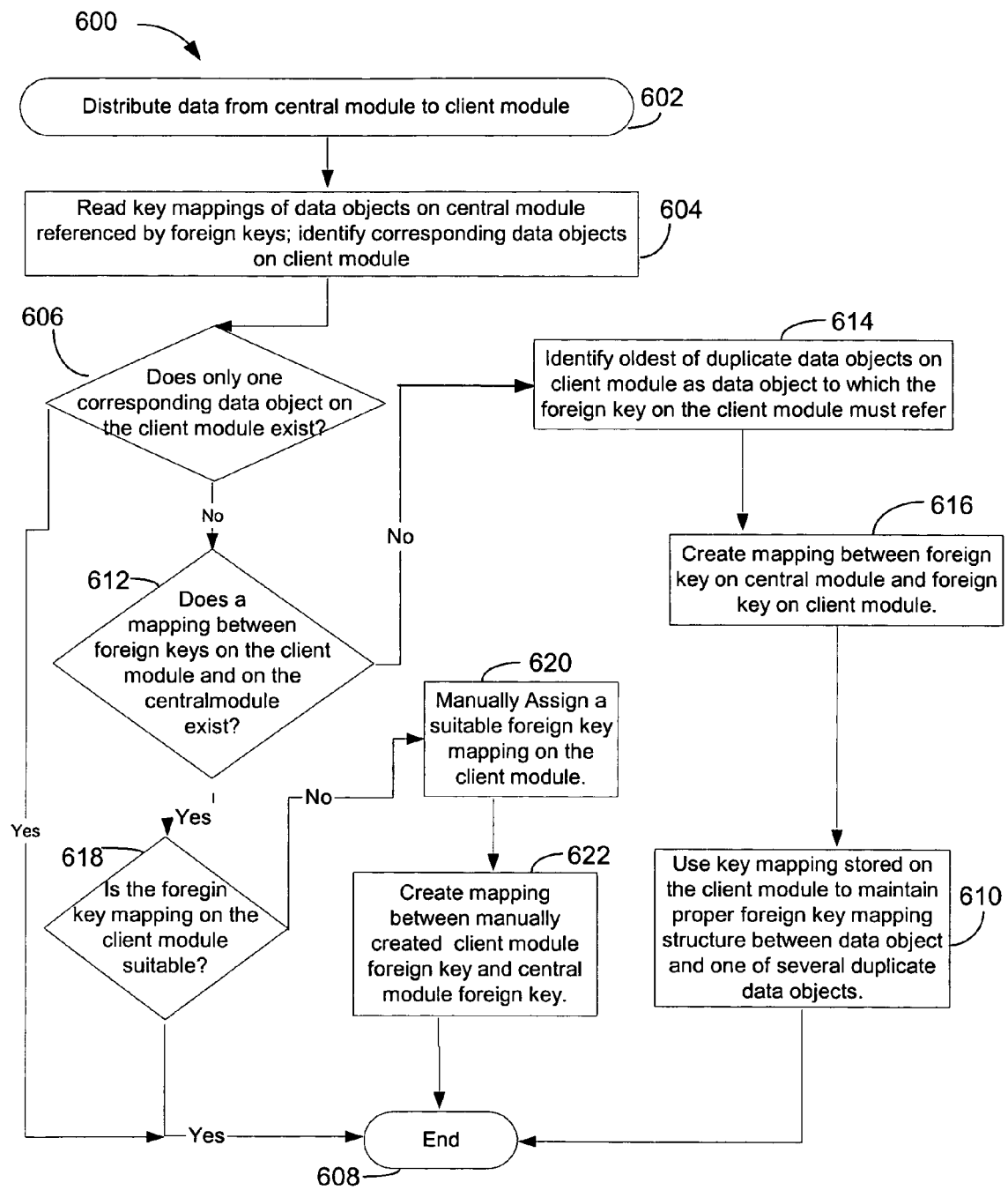
FIG. 6 is a block diagram of an example integration engine.

Referring to FIG. 6, when data are distributed from the central module 100 to a client module 110, a process 600 ensures that foreign key mappings between corresponding data objects (e.g., data objects 422 and 408 correspond and data objects 420 and 402, 404, and 406 correspond) are maintained or are created when needed. When data are distributed from the central module 100 (step 602), the key mapping of the data object 420 that is referenced by the foreign key 424 is read and the corresponding data object(s) 402, 404, and 406 on the client module 110 are identified (step 604). For example, when data objects 420 and 422 are distributed from central module 100, data object 420 is the one that is referenced by the foreign key 424 of data object 422, so the data objects 402, 404, and 406 on the client module 110 that correspond to the data object 420 are identified from the object key mapping that link the data object 420 to data objects 402, 404, and 406 on the client module.

If only one corresponding data object on the client module is identified (step 606), no special treatment is necessary because no ambiguity exists concerning the data object that is referenced by the foreign key 410 in the data object 408 on the client module, so the process can end (step 608). For example, if data object 420 mapped only to one corresponding data object on the client module (i.e., data objects 402 and 406 did not exist), then a mapping between foreign keys 424 and 410 would be unnecessary to maintaining the proper foreign key structure in the client module 110 showing an association between data object 408 and data object 404 when data are distributed from the central module. In such a case, a mapping between foreign keys 424 and 410 might not be created in the first place, because such a mapping is unnecessary to maintain the associations between data objects 408 and 404 identified by the foreign key 410.

If, however, data object 420 corresponds to more than one duplicate data object 402, 404, and 406, then when data are distributed from the central module 100 that data object 420 is distributed to each duplicate data object 402, 404, and 406, and the key mapping between foreign keys 424 and 410 that has been stored on MDS 330 is used to maintain the proper foreign key pointer structure between data object 408 and data object 404 (step 610).

If a mapping between foreign keys 424 and 410 does not exist (step 612) (e.g., because when data were loaded from client module 110 to central module 100 only one data object representing the vendor existed and so a mapping between foreign keys 424 and 410 was superfluous), when data are distributed from central module 100, it may nevertheless be discovered that duplicate data objects 402, 404, and 406 corresponding to the data object 420 on the central module 100 exist. This may occur if additional data objects 402 and 406 are created on the client module 110 after data have been loaded from the client module 110 to the central module 100, but a mapping between foreign keys 424 and 410 was not necessary at the time of the data load. In such a case, the oldest of the duplicate data objects 404 is identified as the data object to which the foreign key 410 must refer, because it was the only existing data object representing the vendor to which the data object 408 referred at the time the data were loaded from the client module 110 to the central module 100 (step 614). Thus, a mapping between the foreign key 424 used on the central module 100 and the foreign key 410 used on the client module can be created when the newly created duplicate data objects 402 and 406 are discovered (step 616).

It can happen that an unsuitable foreign key 410 on the client module 110, which does not correspond to the foreign key 424, on the central module 100 is identified by the foreign key mapping (step 618). For example, while the foreign key 424 may indicate an association between data object 422 and data object 430, the foreign key 410 to which foreign key 424 is mapped may indicate an association between data objects 408 an0d 404. Such a foreign key is unsuitable because data object 404 does not correspond with data object 430, and, hence, the foreign key mapping is unsuitable. Such a situation may arise if a reference from a data object 422 on the central module 100 to a to a foreign object on the central module 100 has changed between the time of the data load to the central module 100 and the data distribution from the central module 100. For example, after the data load, the BOM may have been changed to indicate that materials used in product P should be sourced from the vendor referenced by BP2 430, rather than from the vendor referenced by BP1 420. In such a situation, when the foreign key mapping on the client module 110 needs to be changed but is ambiguous (i.e., the foreign key 410 could refer to either data object 412 or data object 414), a data specialist may manually selected data object 412 or 414 to which the foreign key 410 should point (step 620), and then a mapping between the manually created foreign key 410 on the client module 110 and the foreign key 424 on the central module 100 is created and stored on the central module 100 (step 622).

Figure 7:
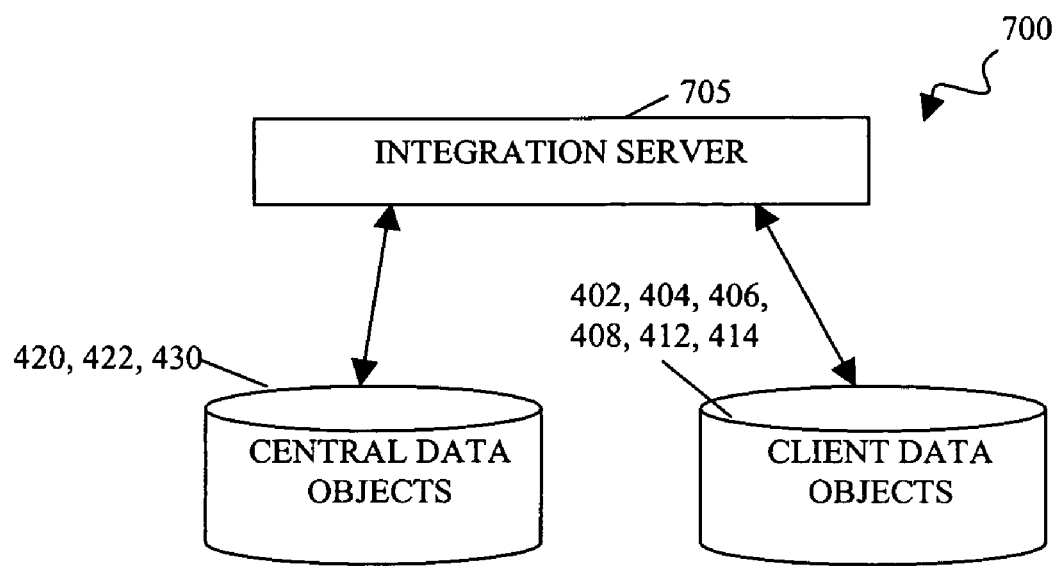
FIG. 7 is a flow chart of a process for mapping representations of information between different systems.

Referring to FIG. 7, an integration engine 700 manages the co-ordination of information stored in the different data models of the central data objects 420, 422, and 430 and the client data objects 402, 404, 406, 408, 412, and 414 so that information from a source system can be processed appropriately by a target system. As shown in FIG. 7, integration engine 700 can include an integration server 705 that results from the performance of machine-readable instructions by one or more data processing machines. Integration server 705 can support open and/or closed standards. For example, integration server 705 can support the Java 2 Enterprise Edition (J2EE) standard or the Advanced Business Application Programming (ABAP) language. Integration server 705 can access data from the central data objects 420, 422, and 430 and the client data objects 402, 404, 406, 408, 412, and 414 to map representations of information between different systems, and the mappings can be distributed to and stored on central module 100 or client module 110.

Figure 8:
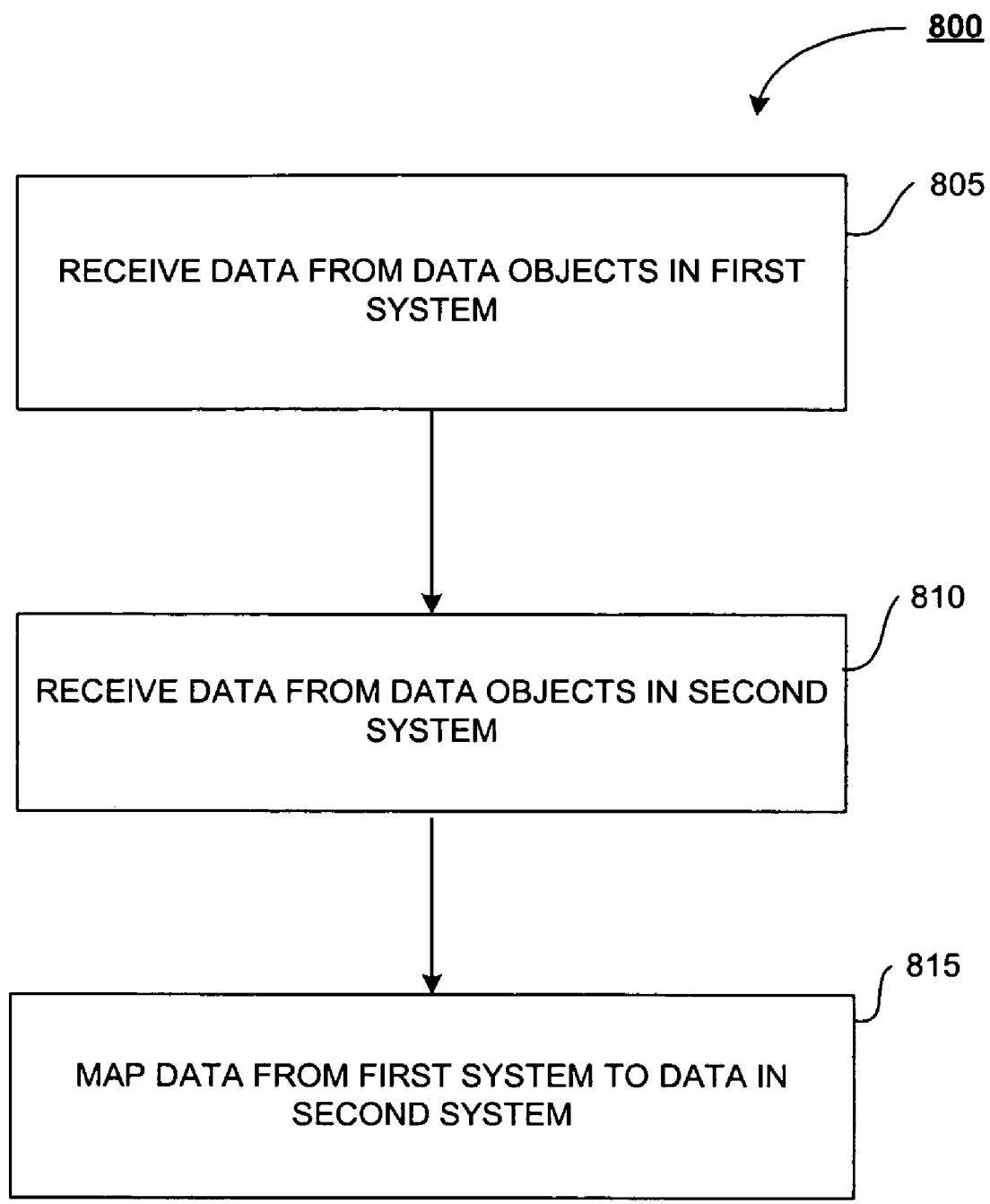
FIG. 8 shows an example of the use of a map to change a representation of data.

FIG. 8 is a flowchart of a process 800 in which an engine can manage different representations of information by mapping representations of information between different systems. An engine performing process 800 receives information describing particular data in a first data processing system (step 805) and particular data in a second data processing system (step 810). A user may select the particular data from the first and second data processing systems to send to the engine. The engine then maps an association between the data from the data objects in the first and the second systems (step 815). The resulting mapping between the data from the data objects from the first and second systems can be machine-readable instructions for making an association between the data in a data object in the first system and data in a data object in the second system.

Figure 9:
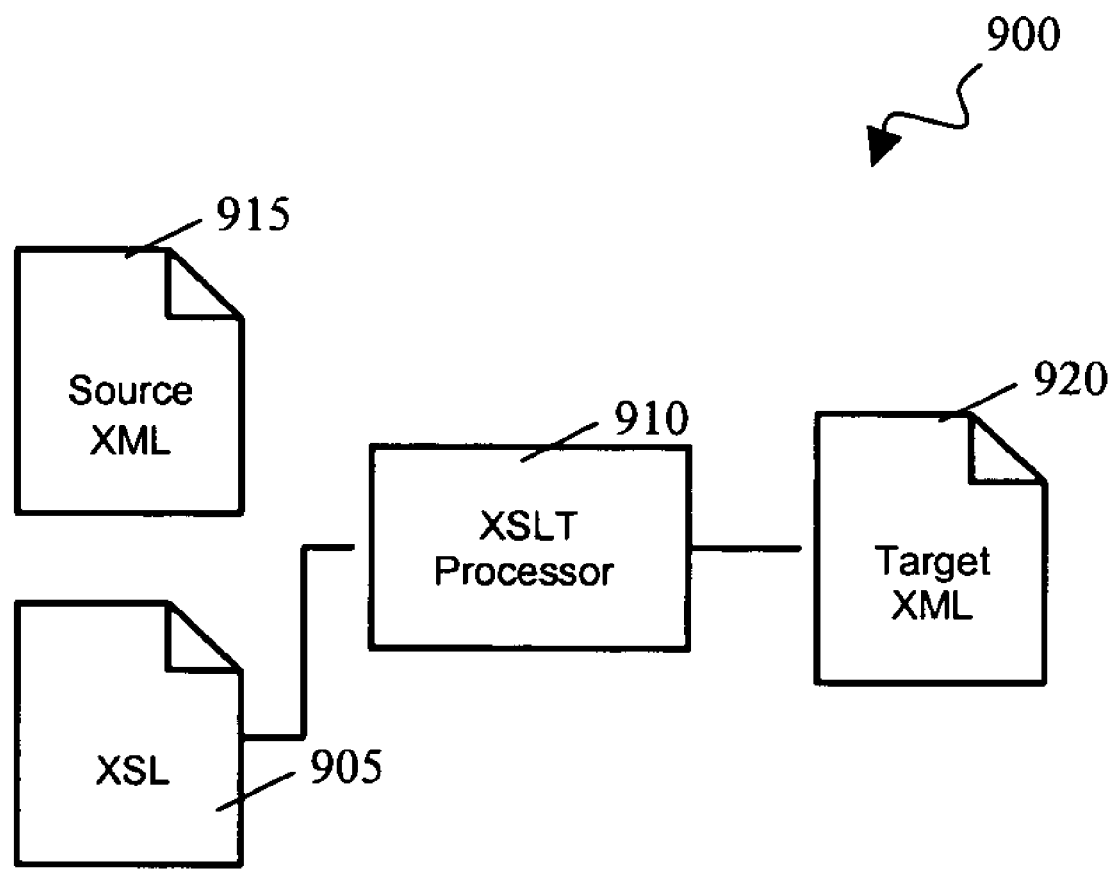
FIG. 9 is a flow chart of a process for distributing data from a central system to a client system based on a mapping between central data objects and client data objects.

FIG. 9 shows a method 900 that uses a map of associations between data from different data processing systems settings 905 to coordinate the transfer of data between the systems. Map of data associations 905 can be machine-readable instructions for creating a result data object with one representation of data from a data object with another representation of data. For example, map of data associations 905 can provide one or more template rules used in creating a result data object. A template rule is a machine-readable definition of criteria for selecting portions of a source data structure and instructions for restructuring the selected portions to create a result data structure. A template can be instantiated for all or a portion of a source data structure to create all or a portion of a result data structure.

Map of data associations 905 can be stored as an extensible stylesheet language (XSL) file that describes, to an extensible stylesheet language-transformation (XSLT) processor 910, how to transform a representation of information in a source system to a different representation for use in a target system. XSLT processor 910 can be an application that associates the pattern of source XML document 915 with the pattern included in a template rule in an XSL map of customization settings 905 and instantiates the template in the template rule. The source system can represent information in a source XML document 915 and the target system can use the information in a target XML document 920 with a different representation.

Figure 10:
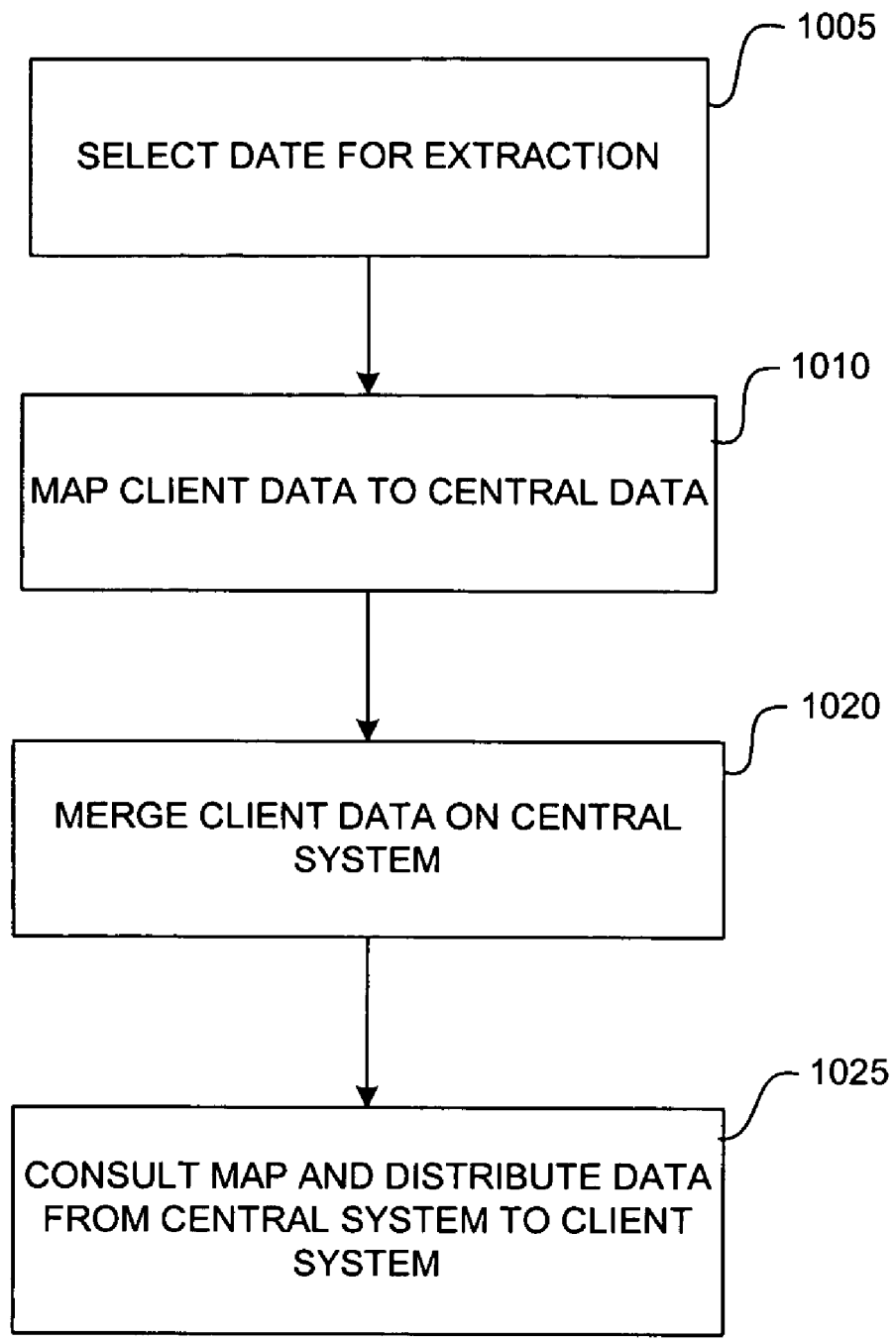
FIG. 10 is a flow chart of a process for loading data from on a first client system into a central system and distributing data from the central system.
Figure 6:
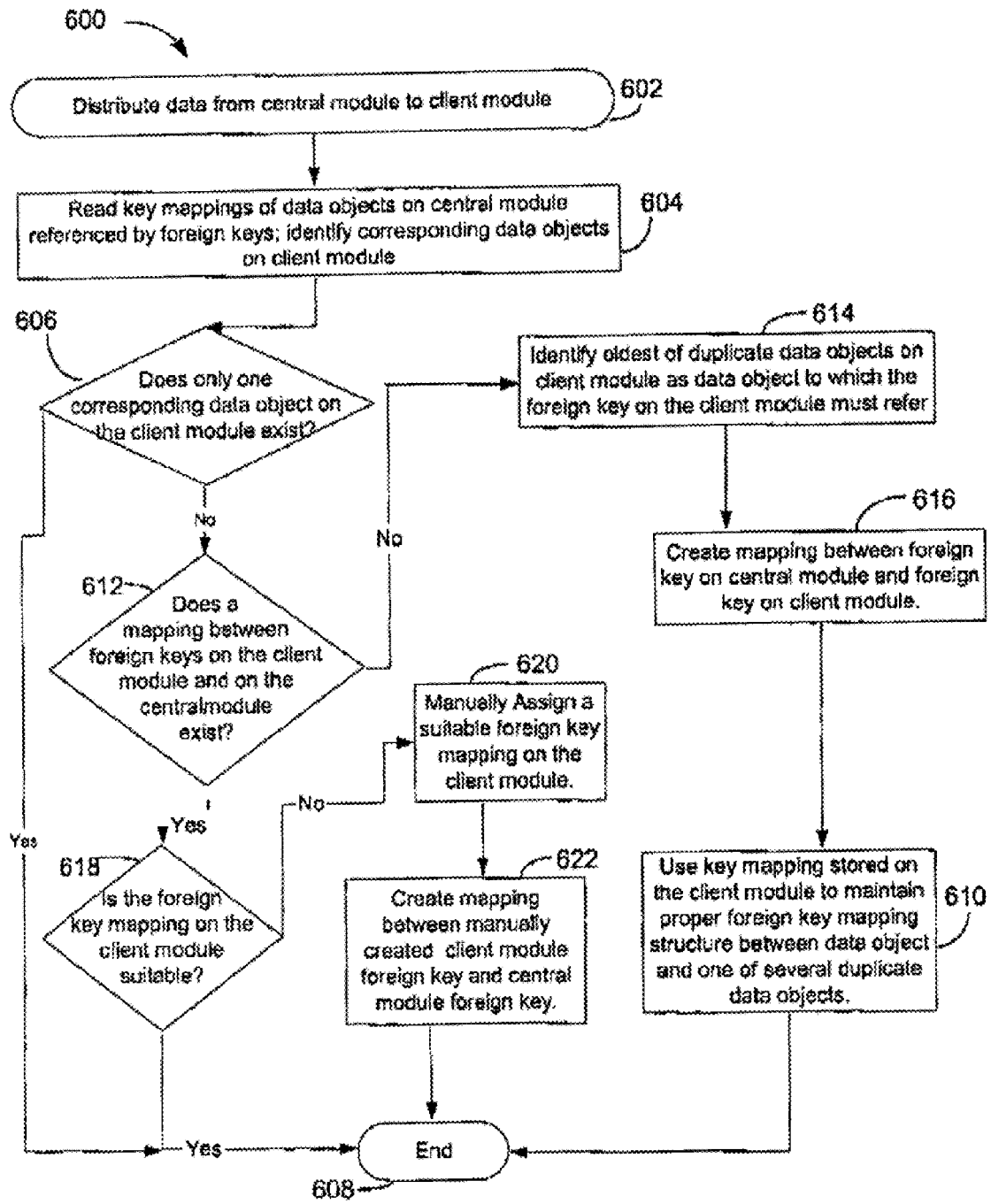

FIG. 10 shows a method 1000 for loading data from a data object stored on a first client system into a central data object stored on a central system, creating mappings between the data stored in the central data object and data stored in client data objects, and distributing data from the central data object to a client data object. A user can select client data to be extracted from one or more client data objects into central data objects (step 1005). The selected client data are matched with data in a one or more central data object and mapping is created between the data in the client data objects and the data in the central data objects (step 1010). The mapping information can be stored on either the central system, the client system, or on both systems (step 1015). The mapping between data in multiple client data objects and a central data object therefore can create a corresponding mapping between data in different client data objects. Data from multiple client data objects then is merged into one central data object (step 1020), and the central data object is posted to a central database on the central system.

When data is distributed from a central data object stored on the central system to one or more client data objects on a client system, the mapping is consulted and the data are extracted from the central data object and distributed according to the mapping the client data object(s) (step 725).

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the

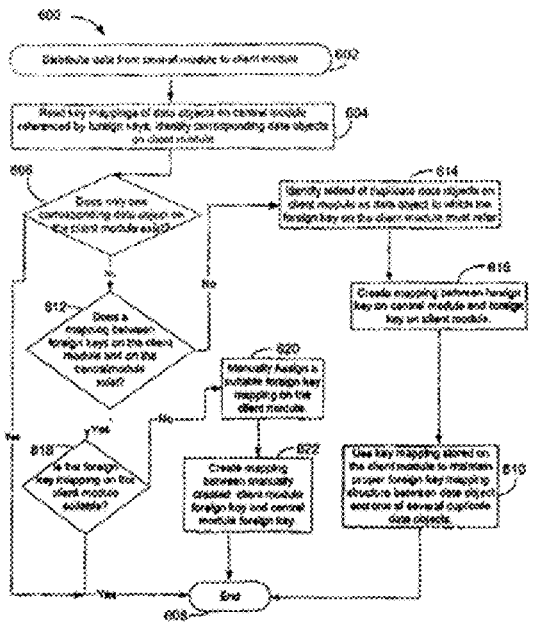

What is claimed is:

1. A computer implemented method of sharing data between a central module and a client module, the method comprising:
    storing a plurality of duplicate first data objects on a first client module;
    storing a second data object on the first client module, wherein the second data object includes a first pointer pointing to one of the duplicate first data objects;
    storing a third data object on the central module, wherein the third data object corresponds to each of the first data objects;
    storing a fourth data object on the central module, wherein the fourth data object corresponds to the second data object and includes a second pointer pointing to the third data object;
    establishing a first mapping between the first data objects and the third data object;
    establishing a second mapping between the second data object and the fourth data object;
    establishing a third mapping between the first pointer and the second pointer;
    storing the first, second, and third mappings; and
    providing the first, second, and third mappings to one or more entities for use in coordinating transfer of data between the central module and the client module.

2. The method of claim 1, further comprising:
    distributing a plurality of duplicate fifth data objects corresponding to the third data object to a second client module;
    distributing a sixth data object corresponding the fourth data object to the second client module; and
    generating a pointer from the sixth data object to one of the duplicate fifth data objects based on the third mapping.

3. The method of claim 2, wherein the second client module is different from the first client module.

4. The method of claim 2, wherein the second client module is identical to the first client module and wherein the fifth data objects update information stored in the first data objects and the sixth data object updates information in the second data object.

5. The method of claim 1, further comprising identifying data objects as duplicate first data objects based on information contained in each of the data objects.

6. The method of claim 5, further comprising consolidating information in the duplicate first data objects on the client module into a single third data object on the central module.

7. The method of claim 1, further comprising:
    storing a seventh data object on the central module; and
    changing the second pointer to point from the fourth data object to the seventh data object.

8. The method of claim 7, further comprising:
    distributing a plurality of duplicate eighth data objects to a second client module, wherein the eighth data objects correspond to the seventh data object;
    distributing a sixth data object to the second client module, wherein the sixth data object corresponds the fourth data object;
    generating a third pointer from the sixth data object to one of the duplicate eighth data objects;
    generating a fourth mapping between the third pointer and the second pointer; and
    storing the fourth mapping.

9. The method of claim 8, wherein the third pointer is manually generated.

10. A system for sharing data, the system comprising:
    one or more client modules, wherein a first client module includes a first client data store adapted for storing a plurality of duplicate first data objects and a second data object, and wherein the second data object includes a first pointer pointing to one of the duplicate first data objects; and
    a central module including a central data store adapted for storing a (i) third data object, wherein the third data object corresponds each of the first data objects, (ii) a fourth data object, wherein the fourth data object corresponds to the second data object and includes a second pointer pointing to the third data object, (iii) a first mapping between the first data objects and the third data object, (iv) a second mapping between the second data object and the fourth data object, and (v) a third mapping between the first pointer and the second pointer.

11. The system of claim 10, further comprising a second client module, wherein the central module is adapted for distributing a plurality of duplicate fifth data objects corresponding to the third data object to the second client module, distributing a sixth data object corresponding the fourth data object to the second client module and generating a pointer from the sixth data object to one of the duplicate fifth data objects based on the third mapping.

12. The system of claim 11, wherein the second client module is different from the first client module.

13. The system of claim 11, wherein the second client module is identical to the first client module and wherein the fifth data objects update information stored in the first data objects and the sixth data object updates information in the second data object.

14. The system of claim 10, wherein the central module is further adapted for identifying data objects as duplicate first data objects based on information contained in each of the data objects.

15. The system of claim 14, wherein the central module is further adapted for consolidating information in the duplicate first data objects on the client module into a single third data object on the central module.

16. The system of claim 10, wherein the central module is further adapted for storing a seventh data object and changing the second pointer to point from the fourth data object to the seventh data object.

17. The system of claim 16, wherein the central module is further adapted for distributing a plurality of duplicate eighth data objects to a second client module, wherein the eighth data objects correspond to the seventh data object, and distributing a sixth data object to the second client module, wherein the sixth data object corresponds the fourth data object.

18. The system of claim 17, where in the central module is further adapted for receiving a third manually-generated pointer from the sixth data object to one of the duplicate eighth data objects, generating a fourth mapping between the third pointer and the second pointer, and storing the fourth mapping.

* * * * *

UNITED STATES PATENT AND TRADEMARK OFFICE
CERTIFICATE OF CORRECTION

| | |
|---|---|
| PATENT NO. | : 7,386,578 B2 |
| APPLICATION NO. | : 10/975490 |
| DATED | : June 10, 2008 |
| INVENTOR(S) | : Fuerst |

It is certified that error appears in the above-identified patent and that said Letters Patent is hereby corrected as shown below:

The title page showing the illustrative figure should be deleted to be replaced with the attached title page.

The drawing sheet, consisting of Fig. 6, should be deleted to be replaced with the drawing sheet, consisting of Fig. 6, as shown on the attached page.

In the drawings:

On sheet 6 of 10, in Fig. 6 (Box 612), line 5, delete "centralmodule" and insert -- central module --, therefor.

On sheet 6 of 10, in Fig. 6 (Box 618), line 1, delete "foregin" and insert -- foreign --, therefor.

In column 3, line 17, delete "an" and insert -- a --, therefor.

In column 5, line 21, after "of" delete "a".

In column 5, line 56, delete "10" and insert -- 110 --, therefor.

In column 10, line 18, delete "an0d" and insert -- and --, therefor.

In column 13, line 5, in Claim 1, delete "computer implemented" and insert -- computer-implemented --, therefor.

UNITED STATES PATENT AND TRADEMARK OFFICE
CERTIFICATE OF CORRECTION

PATENT NO. : 7,386,578 B2
APPLICATION NO. : 10/975490
DATED : June 10, 2008
INVENTOR(S) : Fuerst It is certified that error appears in the above-identified patent and that said Letters Patent is hereby corrected as shown below:

In column 14, line 15, in Claim 10, after "corresponds" insert -- to --.

In column 14, line 57, in Claim 18, delete "where in" and insert -- wherein --, therefor.

Signed and Sealed this

Third Day of March, 2009

JOHN DOLL
*Acting Director of the United States Patent and Trademark Office*

(12) United States Patent
Fuerst

(10) Patent No.: US 7,386,578 B2
(45) Date of Patent: Jun. 10, 2008

(54) ASSOCIATIONS BETWEEN DUPLICATE MASTER DATA OBJECTS

(75) Inventor: Karl Fuerst, Walldorf (DE)

(73) Assignee: SAP AG, Walldorf (DE)

(*) Notice: Subject to any disclaimer, the term of this patent is extended or adjusted under 35 U.S.C. 154(b) by 435 days.

(21) Appl. No.: 10/975,490

(22) Filed: Oct. 28, 2004

(65) Prior Publication Data
US 2006/0101096 A1   May 11, 2006

(51) Int. Cl.
G06F 17/30 (2006.01)
(52) U.S. Cl. .................. 707/201; 707/204
(58) Field of Classification Search .......... 707/204, 707/201
See application file for complete search history.

(56) References Cited

U.S. PATENT DOCUMENTS

| | | |
|---|---|---|
| 6,253,213 B1 | 6/2001 | Vanderschaaf |
| 2002/0033844 A1 | 3/2002 | Levy et al. |
| 2002/0156761 A1 | 10/2002 | Chen et al. |
| 2002/0165961 A1 | 11/2002 | Everdell et al. |
| 2003/0023471 A1 | 1/2003 | Kettler, III et al. |
| 2003/0115336 A1 | 6/2003 | Auerbach et al. |
| 2003/0212654 A1 | 11/2003 | Harper et al. |
| 2004/0031038 A1 | 2/2004 | Kidder et al. |
| 2004/0039727 A1 | 2/2004 | Dessloch et al. |
| 2004/0103182 A1* | 5/2004 | Krabel et al. ............ 709/223 |
| 2004/0117358 A1 | 6/2004 | von Kaenel et al. |
| 2006/0064465 A1 | 3/2006 | Fuerst |

FOREIGN PATENT DOCUMENTS

| | | |
|---|---|---|
| EP | 1043671 A2 | 10/2000 |
| WO | WO 01/27806 | 4/2001 |
| WO | WO 2004/057478 | 7/2004 |

OTHER PUBLICATIONS

Chengkuo et al., "Object Mapping for Layered Cooperative Systems", pp. 67-76, IEEE 1999.
Strom et al., "Concurrency Control and View Notification Algorithms for Collaborative Replicated Objects", pp. 194-203, IEEE 1997.

(Continued)

*Primary Examiner*—Wilson Lee
*Assistant Examiner*—Kim T Nguyen
(74) *Attorney, Agent, or Firm*—Schwegman, Lundberg & Woessner P.A.

(57) ABSTRACT

In a method of sharing data between a central module and a client module, a plurality of duplicate first data objects and a second data object are stored on a first client module, where the second data object includes a first pointer pointing to one of the duplicate first data objects. A third data object and a fourth data object are stored on the central module, where the third data object corresponds to each of the first data objects, and where the fourth data object corresponds to the second data object and includes a second pointer pointing to the third data object. A first mapping is established between the first data objects and the third data object. A second mapping is established between the second data object and the fourth data object. A third mapping is established between the first pointer and the second pointer, and the first, second, and third mappings are stored.

18 Claims, 10 Drawing Sheets